US008630969B2

United States Patent
Ziegler

(10) Patent No.: US 8,630,969 B2
(45) Date of Patent: Jan. 14, 2014

(54) SYSTEMS AND METHODS FOR IMPLEMENTING BUSINESS RULES DESIGNED WITH CLOUD COMPUTING

(75) Inventor: Carsten Ziegler, Meisenweg (DE)

(73) Assignee: SAP AG, Walldorf (DE)

( * ) Notice: Subject to any disclaimer, the term of this patent is extended or adjusted under 35 U.S.C. 154(b) by 447 days.

(21) Appl. No.: 12/907,068

(22) Filed: Oct. 19, 2010

(65) Prior Publication Data

US 2012/0095950 A1    Apr. 19, 2012

(51) Int. Cl.
*G06F 15/173*   (2006.01)
(52) U.S. Cl.
USPC ............................................ 706/47; 709/226
(58) Field of Classification Search
USPC ........................................... 706/47; 709/226
See application file for complete search history.

(56) References Cited

U.S. PATENT DOCUMENTS

| 8,224,761 B1* | 7/2012 | Rockwood ...................... 706/47 |
| 8,352,444 B1* | 1/2013 | Chang ........................... 707/694 |
| 2010/0042720 A1* | 2/2010 | Stienhans et al. ............. 709/226 |

* cited by examiner

*Primary Examiner* — Jeffrey A Gaffin
*Assistant Examiner* — Ola Olude Afolabi
(74) *Attorney, Agent, or Firm* — Finnegan, Henderson, Farabow, Garrett & Dunner, LLP

(57) ABSTRACT

Systems and methods presented herein may involve locally executing rules (e.g., business rules) that are designed in a remote computing cloud. Systems and methods may include receiving a file representing modified rules from the remote computing cloud and compiling the file locally for integration into a local system. By separating the design and execution phases of the rules, new versions of the rule design application(s) may be utilized in the remote cloud to design local rules without upgrading or otherwise changing the applications that implement the rules on the local system.

18 Claims, 4 Drawing Sheets

| Insert | Remove | Copy | Export |
|---|---|---|---|
| Number of Products | Delayed Payments | Output Value | |
| more than 5 | less than 15 | 500 | |
| more than 5 | between 15 and 25 | 300 | |
| between 3 and 5 | greater than 25 | -100 | |
| 2 | greater than 4 | 200 | |
| 1 | greater than 2 | -25 | |

*FIG. 2*

SYSTEMS AND METHODS FOR IMPLEMENTING BUSINESS RULES DESIGNED WITH CLOUD COMPUTING

DESCRIPTION OF THE EMBODIMENTS

1. Field of the Embodiments

The embodiments relate generally to computer-implemented technologies for business rule creation and implementation, and, more specifically, to systems and methods for modifying rules in a cloud computing and locally implementing the modified rules.

2. Background

Companies often use business software solutions that help organize and streamline their business by improving insight, efficiency, and flexibility. These business solutions, such as enterprise software solutions, solutions for small businesses and midsize companies, on-demand solutions, and others are built on platforms that consolidate data, which simplifies the IT environment and reduces operational costs. This, in turn, frees resources to focus on strategic, innovative solutions.

One common component of such a business software solution is a business rule engine. The business rule engine is used to design and run business rules that are tailored to the particular system. A business rule may, for example, be used to detect that a particular business situation has occurred or to analyze whether or not information provided to the system meets certain criteria (e.g., checking whether a loan meets underwriting criteria). Product or service pricing may also be specified or determined by business rules. Other types of business rules, sometimes called work flow rules, may check for and/or respond to events affecting the actual business process (e.g., detecting a routing point overload and specifying what to do about it).

Business rules may change much more often than other aspects of the business system. For example, pricing may change weekly or even daily in some businesses. Because business rules typically change more often that the rest of the business application code, a business rules design component may allow companies to change their business rules as needed with minimal IT intervention.

However, technical releases and updates for the business rules engine are often bundled with updates for the other components of the business software solution, including various technical features. This bundling forces the customer (e.g., company running the business) to update the technical features of the system in addition to the business rules engine. Updating the entire solution may be very expensive for the customer, both in terms of costs to purchase (or license) and costs to implement, particularly in complex business systems. Because business rules are updated more often than the other parts of the system, it is often most important that the customer has the most up-to-date rules engine, thus creating a tension as to whether to update the entire business solution (i.e., software solution and/or hardware).

In the past, business rules engines have not been provided by remote Internet-based solutions. Other types of applications have been provided using Internet-based computing called "cloud computing," which involves supplying resources and software to computers on demand, analogous to an electricity grid. But cloud computing has never been used to provide business rule engines because of the inefficiencies that would be introduced by providing different parts of the business system at different geographic locations. Business rule execution is highly performance-critical, and therefore business rules are typically run as locally as possible to the backend data that is used by the rules. The extra time required for remote operation of the rules, aggregated over the massive number of transactions that take place in some business systems, has made remote rule invocation prohibitive.

Therefore, a need exists for providing an updatable business engine component separately from the technical environment in which the rules run, without sacrificing efficiencies when the business system is running.

Accordingly, systems and methods are provided herein for creating business rules using remote cloud computing that are implemented locally in the local system (e.g., customer productive system) to which the rules belong.

SUMMARY

Embodiments described herein include systems and methods for designing business rules in a remote computing cloud and implementing the rules on a local system (e.g., customer productive system). In one embodiment, the local system requests at least a portion of a rule design interface from a remote computing cloud. The portion of the rule design interface may be part of a remote application hosted and executed in the remote computing cloud. This remote application may be updated (i.e., upgraded) independently from the local system and local applications thereon. The local system then may receive, over a network (e.g., the Internet), a modified set of business rules from the remote computing cloud that were created via the rule design interface. The requesting and/or receiving stages may include communicating over a secure network service that connects the local system to the remote computing cloud, such that the local application and remote computing cloud communicate with one another using remote procedure calls.

Once the modified business rules are received, the local system may integrate (e.g., compile) the modified set of rules to operate with a local business application with which the rules are designed to operate. The compiled modified rules may be stored on a local non-transient memory that is part of the local system.

Subsequent to compiling the modified rules, the local system then applies the modified rules to backend data to perform the business task during runtime of the local business application.

Another embodiment described herein includes a computer-implemented method that is implemented by one or more processors of a computing cloud. The method may include receiving a request for at least a portion of a rule design interface, the request including an indicator related to a backend system in which the rules will operate, the backend system being remote from the computing cloud, wherein the backend system is one of a plurality of systems that utilize the computing could for rule design. The computing cloud may, in one embodiment, locate a current set of rules in a database by using the received indicator.

In response to the request, the method may include providing a rule design interface populated with a current set of rules related to the indicator. Then, modifications may be received, and the set of rules may be modified accordingly in the computing cloud. The modified set of rules may be stored in a database in the computing cloud in one embodiment. The rule design interface and the underlying rule design application may be updated in the computing cloud independently of the local systems that the rule design application provides rules to.

The method may also include creating a file representing the modified set of rules by utilizing the indicator to identify a programming language and/or structure that is usable by the remote backend system. In one embodiment, the method may include identifying an application programming interface to use in making the modified rule set compatible. The appropriately formatted file may then be transmitted to the remote backend system for compilation and execution on the backend system.

In addition to computer-implemented methods, embodiments disclosed herein include a non-transitory tangible computer-readable medium and a system that includes a processor.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2 is an exemplary illustration of a rule design interface including a decision table, in accordance with an embodiment;

DESCRIPTION OF THE EMBODIMENTS

Figure 1:
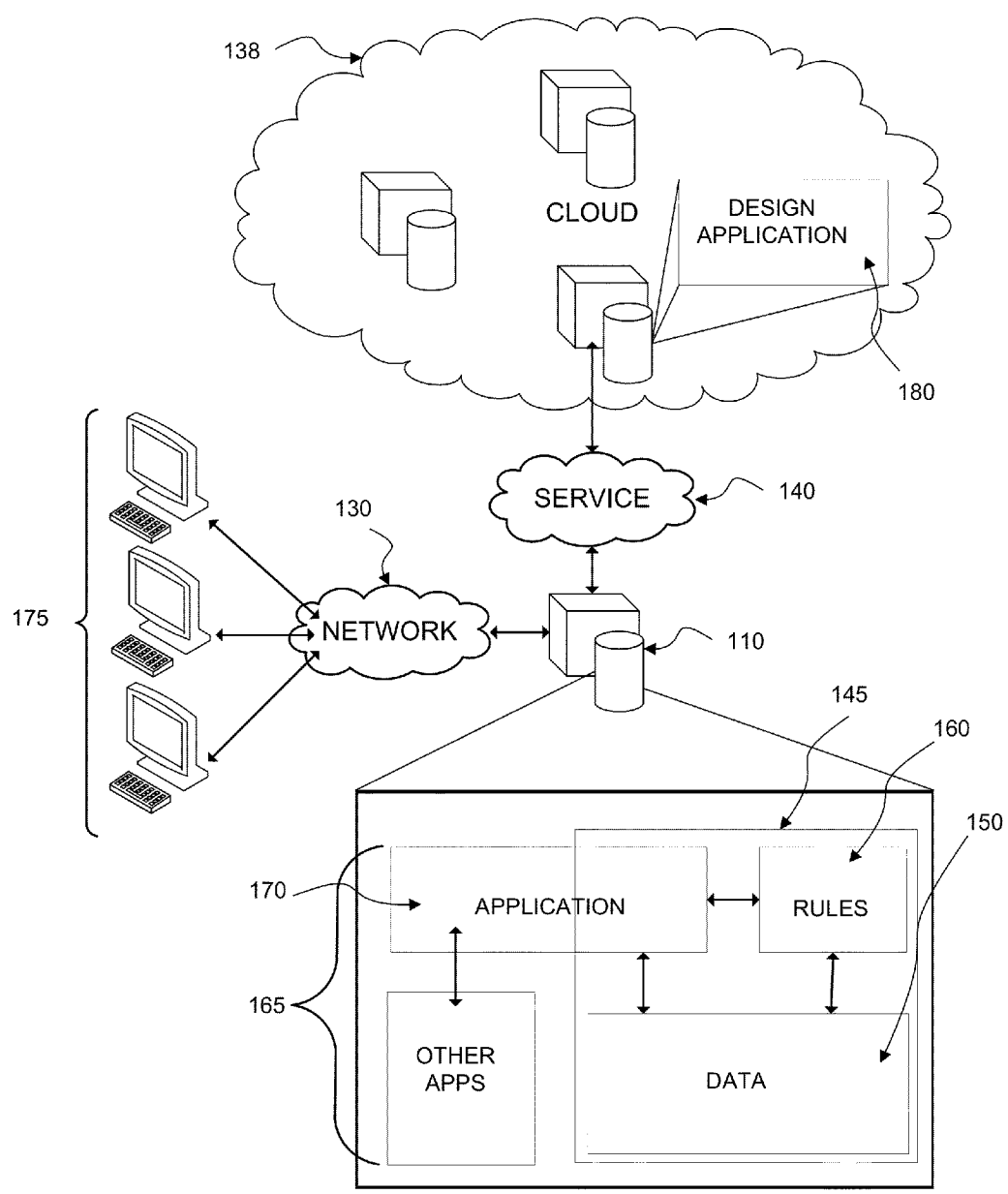
FIG. 1 is an exemplary illustration of a local system that implements at least a portion of rule design in a remote computing cloud but executes the rules locally, in accordance with an embodiment.

Reference will now be made in detail to the present exemplary embodiments, including examples illustrated in the accompanying drawings. Wherever possible, the same reference numbers will be used throughout the drawings to refer to the same or like parts.

Exemplary embodiments herein allow a local system to utilize a rule design component that is located remotely in a computing cloud, while still running the resulting set of rules locally. In one embodiment, the local system requests at least a portion of a rule design interface, which runs and/or is provided as part of an remote rule design application stored and executed in the remote computing cloud. A modified set of rules, therefore, may be designed by accessing the rule design application remotely. The same rule design application (e.g., component) may serve multiple different systems. Additionally, the rule design application may be updated independently from applications on local systems that implement the rules created with the rule design application, which effectively separates the costs of updating a rules engine from the costs of updating other aspects of the local system.

In one embodiment, the request from the local system includes an identifier that allows the computing cloud to identify a current set of rules, current format of the runtime application, a version of the runtime application, and/or distinguish the local system 110 from a plurality (e.g., hundreds or thousands) of other systems serviced by the computing cloud 138. With this information, the computing cloud may provide a modified set of rules that are compatible with the runtime application of the local system. This also allows the design time application of the computing cloud to service various different versions or and types of business applications for multiple different business customers.

By locally storing and implementing the remotely modified rules, the performance of the business system is improved compared to running the rules in the remote computing cloud. Running the rules remotely comes at a high cost for data transfer and rule invocations, because this is done via web services.

As used herein, "modified rules" may include completely new rules created for the first time in addition or in alternative to changes to pre-existing rules. A modified rule set may be any set of rules resulting from using the remote rule design interface.

As referred to above and herein, a "remote computing cloud" comprises one or more servers located remotely from a local system. The server(s) provide physical infrastructure and applications that are remotely accessed by a local system. Each server may comprise one or more non-transient computer-readable mediums and one or more processors.

As referred to above and herein, a "local system" may also comprise one or more servers. This server(s) may comprise at least one processor that executes instructions representing a business application. The business rules may be integrated (e.g., compiled) on this server(s) and can locally interact with the business application. The local system may comprise one or more non-transient computer-readable mediums and one or more processors.

As used herein, the term "local" may indicate that devices are connected directly to one another and/or connected over a local area network. The term "local" is also used for convenience herein to distinguish hardware that is not part of a computing cloud located remotely relative to a (local) system. It is understood that devices that connect to each other over the Internet, rather than directly or over a local area network (or similar), are not local to one another. On the other hand, the term "remote" may indicate that devices communicate with one another over the Internet or some other non-local network. Systems that communicate in this fashion are deemed "remote" from one another for convenience of discussion herein.

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include a processor and a memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

FIG. 1 is an exemplary illustration of a local system 110 capable of communicating with a remote computing cloud 138 via a network service 140. In one embodiment, the local system 110 may include at least one processor that may execute instructions stored on a non-transient memory to run a business application 170.

The local system 110, in one embodiment, may be accessed by one or more user devices 175 over a network 130. The network 130 may be a local area network (LAN), or some other type of network, including the Internet. The user devices 175 may be used to retrieve and/or enter data 150 from and/or to the local system 110 by connecting, for example, to a frontend portion of the system. The local system 110 stores the data 150 in a backend portion 145 of the system 110, in a non-transient computer-readable medium such as a database of backend 145 (i.e., a repository). The backend portion 145 of the local system 110 may be accessible by administrators.

In this arrangement, the business application 170 may run on the local system 110, providing the business system's functionality. Although application 170 is referred to herein as a single application for simplicity, in an embodiment application 170 is a software solution comprising multiple interrelated applications that are used to run the business system. In one embodiment, a customer (e.g., a business) may purchase or license a business solution that includes application 170. Then, the customer may customize application 170 by creating rules 160 that define how the particular business system operates. A portion of the application(s) 170 may run as part of the backend portion 145 of the system, accessible by administrators. Another portion of the application 170 may run in a frontend, providing a means for the public or other types of users to access features of the business. In some instances, other applications 170 includes a frontend component or application, such as a web interface for running reports and other business tasks.

User devices 175 may be connected to the local system to allow users to perform particular business functions. For example, a user might access a frontend portion of application 170 to execute reports. The reports, in turn, may use backend processes, such as stored procedures using business rules 160 on data 150 in the backend portion 145 of the local system 110. In another embodiment, a user device 175 may input information into local system 110. For example, sales information may be entered as part of an ordinary business transaction, which may trigger the use of one or more rules 160, and result in sales data being stored as data 150 in the backend portion 145 of the local system 110. Business rules 160 may also be used, for example, in validating and/or interpreting data input into the local system 110. The business rules 160 may also be used in conjunction with the data 150 to carry out various other business tasks executed by the application 170. In general, the business rules 160 customize the operation of the application 170 and help distinguish the particular business system of one user from business systems of other users.

In one embodiment, the business rules 160 are also stored in the backend portion 145 of the local system 110. By executing the business rules 160 in close proximity to the data 150, performance of the local system 110 generally may be increased.

In one embodiment, the local system 110 may connect to remote computing cloud 138 over the Internet. The local system 110 may exchange information with the remote computing cloud 138 using a secure network service 140. The specific type of secure network service 140 used may vary among embodiments. The secure connection may include the use of certificate tokens, encryption, virtual private networks, and other known methods of creating a secure connection. The exchange of information may include a plurality of remote procedure calls between the local system 110 and remote computing cloud 138.

In one embodiment, the local system 110 requests at least a portion of a rule design interface from a remote computing cloud 138. The rule design interface provides a user with the ability to modify and/or create business rules for use in a local system. To this end, the specific functionality and graphical layout of the rule design interface may vary between embodiments. In one aspect, the rule design interface of the remote computing cloud 138 may be altered, updated, and even dramatically changed without any update to the application 170 of the local system 110.

The requested portion of the rule design interface may be all or part of a design time application 180 hosted and executed in the remote computing cloud for creating and/or modifying business rules. For example, the entire rule design interface (i.e., the entire portion) can be executed and provided by the computing cloud 138 in one embodiment. In other words, the rule design interface may be completely rendered within the cloud in one embodiment. Alternatively, at least a portion of the rule design interface can be rendered locally, utilizing information received from the remote computing cloud 138. For example, the remote computing cloud 138 may provide a decision table (or data to populate a decision table) in one embodiment, and the graphical portions of the rule design interface may be rendered locally.

FIG. 2 is an exemplary illustration of a rule design interface 200 in accordance with an embodiment. The rule design interface 200 may include a decision table 210 that defines one or more rules for use by the local application 110. Such rules can assign one or more inputs to an output. For example, row 220 indicates that when there are more than five products and less than 15 payments, an output value of 500 is generated. This rule can be used in running application 170, and may be edited by changing the entries in row 220 or by using various functions (e.g., associated with buttons 230) that can be present on the rule design interface 200.

In one embodiment, the rule design interface 200 (i.e., the entire portion) is completely rendered in the remote computing cloud 138. In another embodiment, a smaller portion of the rule design interface 200 is rendered in the remote computing cloud 138. For example, in one embodiment the remote computing cloud provides the decision table 210 to the local system 110, which implements the decision table 210 into locally-executed graphical framework of the rule design system. In another embodiment, different servers within the cloud 138 are responsible for different portions of the rule design interface, for example, so that different portions of the rule design interface can be changed or updated independently from one another.

In one aspect, the requested rule design interface is presented to a user to appear as if the design time application is part of the application(s) 170 of the local system 110 even when it is rendered remotely. For example, the rule design interface may be embedded into a screen that includes local system 110 information and/or running portions of application(s) 170, such that the design interface is displayed simultaneously with display information generated by the local application 170. In this way, the tools available to the user as part of the application(s) 170 may be displayed in as part of a homogenous interface that includes the rule design interface. This may give the user the impression that the rule design interface is part of the software solution 165 running on the local system 110 even though the design time application is hosted (i.e., stored), maintained, updated, and executed in the remote computing cloud 138 independently from the local business software solution 165.

Additionally, the permissible interactions between the local system 110 and remote computing cloud 138 may vary between embodiments. For example, in one embodiment the service 140 allows the computing cloud 138 to make remote procedure calls on the local system 110. Remote procedure calls can allow the computing cloud 138 to inspect the local system, for example, to determine at least one attribute of application 170 that can be used in providing a customized and/or compatible portion of the rule design interface.

In one embodiment, the computing cloud 138 can execute a remote procedure call to request the fields of the data dictionary and/or schema used by the system 110 in running the business application 170. By obtaining the data dictionary, the computing cloud 138 may, in one aspect, generate a decision table that can be used for modifying (e.g., creating, deleting, or editing) rules that comport with the data infrastructure of the system.

The remote procedure calls can also be used to request the values of the fields (i.e., one type of application attribute) in one embodiment. The current values can be used to populate a decision table so that the user can modify the current rules used by application 170 and system 110.

In this way, in one embodiment, the business rules may be uploaded from the local system and processed on an as-needed basis in the computing cloud. For example, the rule design interface may be displayed to a user of the local system 110 as if it is part of the software solution 165. When the user selects a set of rules to modify that are located on the local system 110, the local system 110 may automatically upload all or part of rules to be modified to the remote computing cloud 138 for modification using the design time application.

In another aspect, the local system 110 may provide a rules identifier (i.e., another type of application attribute) to the remote computing cloud 138 that identifies the local system's 110 current rule set, in one embodiment. The rule set identifier may be used by the remote computing cloud to locate the current set of rules of the local system in a remote database that stores rule sets for multiple different systems. Storing at least a blueprint of the rules remotely may cut down on uploading delays when future iterations of rule design are performed from the local system 110. Once the rules are located, information from the rules may be incorporated into the rule design interface that is displayed to a user of the local system 110.

In still another embodiment, the computing cloud 138 can execute a remote procedure call to obtain information about (or an attribute indicating) the current version of application 170. This may include having the local system 110 provide a version identifier to the remote computing cloud 138 to identify the version of application(s) 170 that runs the business rules. The identifier can allow the design time application 180 in the remote computing cloud 138 to provide a modified rule set that is compatible with the runtime application 170 of the local system 110 (e.g., using the correct programming language, schema, etc.). More particularly, the runtime application 170 may have several different versions released over time, and the version identifier allows the design time application to create rules compatible with the particular version of the runtime application residing on the local system 110. In one embodiment, an application programming interface may provide a template from which the remote computing cloud may design the rules, in one embodiment.

In an alternate embodiment, the version of the application 170 (i.e., one type of application attribute) is sent to the computing cloud 138 by the system 110 when the system 110 requests a portion of the rule design interface. As an example, the request may include metadata that allows the computing cloud 138 and/or design application 180 to identify characteristics of the requesting system 110 and maintain compatibility with that system 110.

In one embodiment, the version identifier may be used by the remote computing cloud 138 to distinguish between different types of applications that may be used on a local system. For example, the version identifier might indicate that local system 110 utilizes a SAP runtime application compatible with ABAP code. In this instance, the remote computing cloud 138 could create a rule set written in ABAP code to be compatible with the runtime application 170. However, a second (and different) local system might submit a version identifier indicating a runtime application written in JAVA™. In this instance, the remote computing cloud 138 could utilize the version identifier to create a rule set written in JAVA code to be compatible with the JAVA runtime application.

In one embodiment, separate identifiers (i.e., attributes) may be provided for identifying the application type and the application version. Alternatively, a single version identifier may be used to identify both the specific application that will run the rules and the version of that application.

In this way, the remote computing cloud 138 may create at least one file in a compatible format, representing the modified set of rules created using the rule design interface. In one embodiment, the file comprises at least one class that represents the modified business rules. The class may be used by the application 170 to implement a modified business rule after the file is compiled at the local system 110. The class may contain definitions of various rule attributes that are utilized by application 170 (e.g., by stored procedures that are part of application 170). In another embodiment, the file is an executable that is run on the local system to unpack and/or integrate (e.g., compile) the rules. In yet another embodiment, the modified rule set 160 is provided in the form of stored procedures that are compiled by running them locally on a backend 145 database of the local system 110.

In one embodiment, the remote computing cloud sends the modified rule set 160 to the local system 110 to reside locally with the backend data 150. This may be facilitated using the secure network connection in one embodiment. In one aspect, the computing cloud 138 may make a remote procedure call to send the modified rule set to the local system 110 and integrate the modified rule set with application 170.

The exact location to which the file is delivered may vary in different embodiments. In one aspect, the application 170 specifies a particular location for modified rule sets to be delivered. This may be communicated to and/or determinable by the remote communication cloud 138 based on the version identifier. Additionally, the application 170 may be set up to automatically compile any new files found at the specific location when application 170 is no longer running. The compiled code may be stored on a non-transient memory that is part of the local system.

In another embodiment, the remote computing cloud schedules a job with the local system 110 to compile the file at a specific time, such as during system maintenance. This scheduling may be done as part of a remote procedure call in one aspect. In one embodiment, a user may select the specified compile time while using the rule design interface. In another embodiment, the compile time is scheduled on the local system 110 in response to receiving the file from the remote computing cloud 138. In this embodiment, the compilation may be completely automated.

Figure 3:
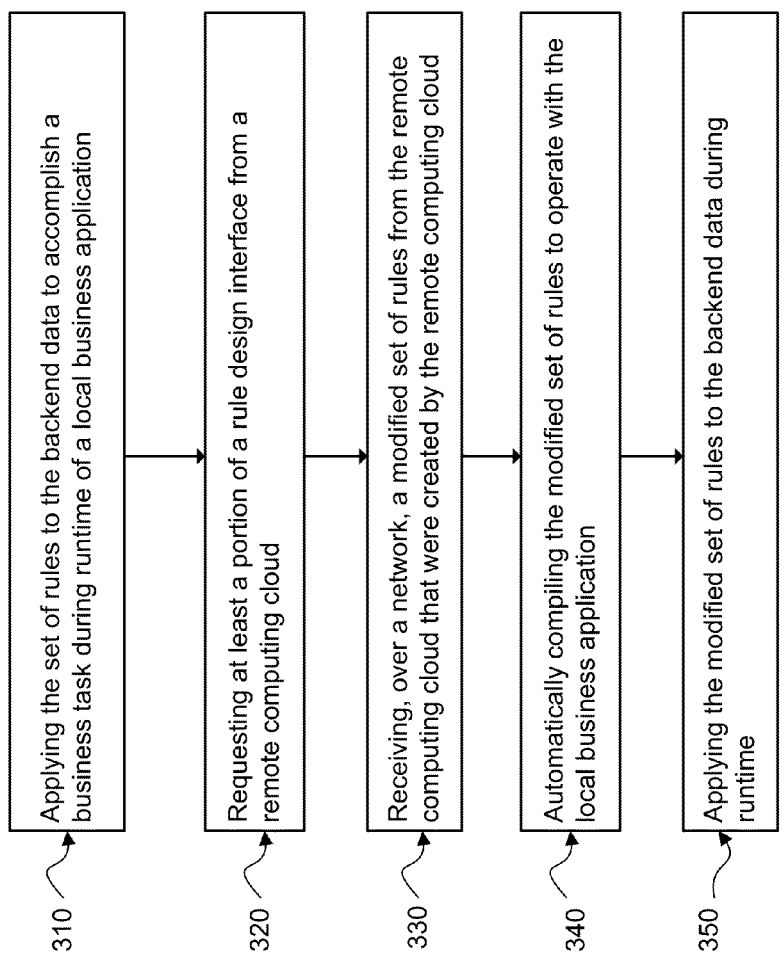
FIG. 3 is an exemplary flow chart with a non-exhaustive listing of steps that may be performed by a local system, in accordance with an embodiment.

Turning now to FIG. 3, exemplary steps performed by a local system in a method in accordance with an embodiment are described. At step 310, the local system 110 applies a set of rules 160 to backend data 150 to accomplish a business task during runtime of local business application 170.

At step 320, the local system may request a portion of a rule design interface from a remote computing cloud. This portion of the rule design interface may be stored and updated on the remote computing cloud 138 independently from the local business application 170. As previously mentioned, in one embodiment, the rule design interface, although hosted and executed in the cloud 138, may be presented to the user as if it is part of the local system 110.

The user may then manipulate the rule design interface to modify the rules (which may include creating new rules), which may be facilitated by the rule design application in the computing cloud 138 rather than on the local system 110.

At step 330, the local system 110 may receive, over a network, a modified set of rules from the remote computing cloud 138, the modified set of rules created via the computing cloud 138. As previously stated, this may be facilitated with a secure network service 140 that allows the remote computing cloud to securely send and receive information with the local system 110. Additionally, the modified set of rules may be provided as a file representing one or more classes recognized by the business application of the local system 110.

At step 340, the local system 110 may automatically compile the modified set of rules to operate with the local business application. The compiling operation may be performed during system downtime in one embodiment. In an embodiment where the modified rules are represented by one or more object classes, the compilation allows the application to instantiate modified business rules during the next runtime period.

At step 350, the modified rule set is implemented during runtime of the local system application. This may include using the modified business rules in conjunction with stored procedures to access and/or modify backend data in one embodiment.

Figure 4:
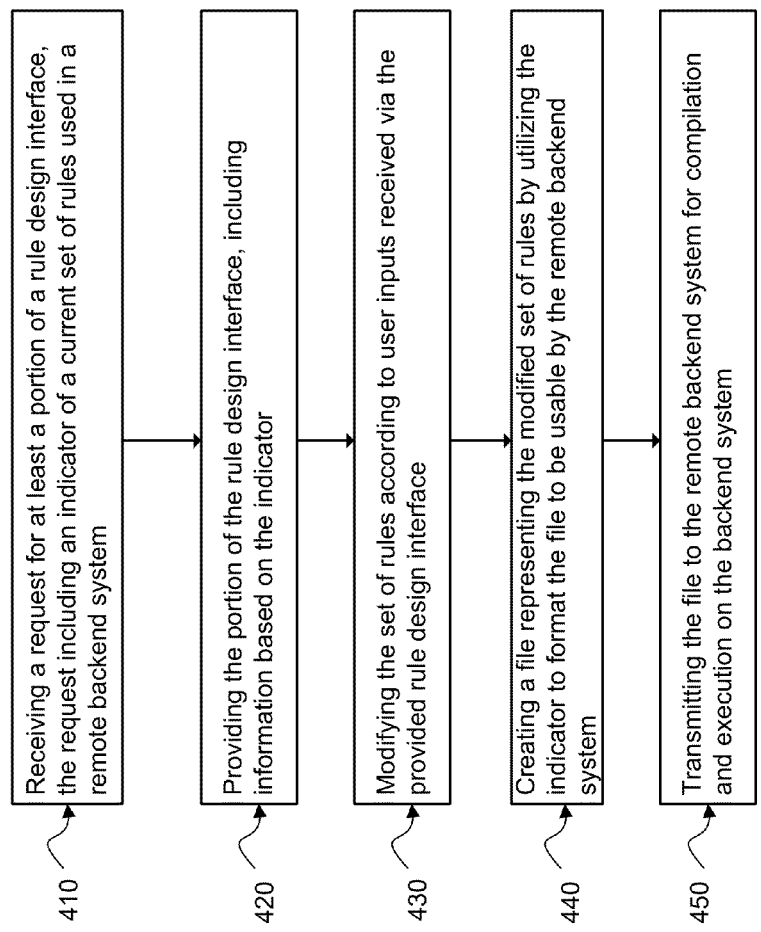
FIG. 4 is an exemplary flow chart with a non-exhaustive listing of steps that may be performed by a remote computing cloud, in accordance with an embodiment.

Turning now to FIG. 4, exemplary steps performed by a remote computing cloud in accordance with an embodiment are described. At step 410, the remote computing cloud 138 receives a request for at least a portion of a rule design interface. The request may come from one of a plurality of local systems (all remote from the computing cloud 138). The request may contain one or more identifiers that allow the remote computing cloud 138 to determine an appropriate interface to provide to the local system and/or user of the local system. For example, the visual appearance of the provided rule design interface may be matched with the visual appearance of the application 170 running on the requesting local system 110 in one embodiment. The one or more identifiers may also be used to retrieve a current version of the rule set to populate the rule design interface in one embodiment.

At step 420, the remote computing cloud 138 provides a rule design interface to the local system 110 (i.e., a remote backend system from the perspective of the computing cloud) and/or user of the local system 110. In one embodiment, the provided rule design interface may be populated by the current set of rules used by the local system.

At step 430, the remote computing cloud may modify the set of rules (which may include creating a completely new set of rules) in accordance with inputs received in the rule design interface.

In one embodiment, the modifications made possible by the rule design interface may be restricted by an application programming interface associated with the application on the local system. The application programming interface may provide a template from which the remote computing cloud may design the rules, in one embodiment. This may provide a means for the remote computing cloud to create a modified rule set that may operate with the application on the local system.

At step 440, the remote computing cloud 138 may create a file representing the modified set of rules. The format of the file may be based on the version of the application on the local system, as previously described. Additionally, the format may be based on the application programming interface associated with the application on the local system in another aspect.

At step 450, the remote computing cloud 138 transfers the file(s) to the local system 110 (i.e., a remote backend system from the perspective of the computing cloud). In one embodiment, the file is transferred to a specific location specified by the local system (e.g., the application on the local system may have a rule download directory where the modified rule set is stored and retrieved for compilation).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for locally implementing business rules that are designed remotely, the system comprising:
   a database for storing backend data;
   a non-transient memory that stores a set of rules that operate with a local application to perform business tasks; and
   a processor coupled to the memory, the processor executing instructions to perform stages comprising:
   requesting at least a portion of a rule design interface from a computing cloud located remotely from the processor, wherein the portion of the rule design interface is stored and updated on the remote computing cloud independently from the local application;
   receiving, over a network, a modified set of rules from the remote computing cloud, the modified set of rules being created via the computing cloud, wherein the requesting and receiving stages include communicating over a secure network service that connects the processor to the remote computing cloud, and wherein the local application and remote computing cloud communicate with one another using remote procedure calls;
   integrating the modified set of rules to operate with the local application;
   storing the integrated modified set of rules on the non-transient memory; and
   subsequent to the integration, applying the modified set of rules during runtime of the local application.

2. The system of claim 1, wherein the processor further performs stages comprising presenting the rule design interface on a display device simultaneously with display information generated by the local application.

3. The system of claim 1, wherein the processor further performs stages comprising transmitting an application identifier to the remote computing cloud, wherein the application identifier corresponds to a version of the local application and a programming language compatible with the application; and wherein receiving the set of modified rules includes receiving a file written in the compatible programming language and configured to compile with the version of the local application.

4. The system of claim 3, wherein the stages further comprise receiving a remote procedure call to integrate the modified set of rules, and, in response, causing the application to use the modified set of rules instead of a prior set of rules.

5. The system of claim 3, wherein the file represents an executable file that is recognized by the local application.

6. The system of claim 1, wherein the processor further performs stages comprising updating the version of the local application independently of the remote computing cloud.

7. A computer-implemented method for locally implementing remotely-designed rules with a local application, the method comprising:
   storing backend data on a local non-transient computer-readable storage medium;
   requesting, via a processor, at least a portion of a rule design interface from a remote computing cloud, wherein the portion of the rule design interface is stored and executed on the remote computing cloud, wherein the requesting is performed using at least one remote procedure call over a secure network service that connects to the computing cloud;
   receiving a modified set of rules from the remote computing cloud that was created via the rule design interface;
   compiling, via the processor, the modified set of rules to operate with the local business application; and
   storing the modified set of rules locally to the backend data.

8. The computer-implemented method of claim 7, further comprising updating a version of the local application independently from the requested portion of the rule design interface.

9. The computer-implemented method of claim 7, further comprising transmitting an application identifier to the remote computing cloud for use in identifying an attribute that distinguishes the local application from a plurality of other applications that connect to the computing cloud, and formatting the modified set of rules based on the identified attribute.

10. A computer-implemented method for providing rule design services from a computing cloud, the method comprising:
    receiving a request for a portion of a rule design interface from a remote requesting entity, wherein the requested portion of the rule design interface is assembled based on information received in response to a remote procedure call made by the computing cloud to the remote requesting entity;
    identifying, via a processor, an attribute of an application corresponding to the requesting entity;
    providing the portion of the rule design interface to the requesting entity that is compatible with the application;
    receiving user inputs that are made by utilizing the rule design interface;
    creating a file representing the modified set of rules by utilizing the attribute of the application to render the file in a format usable by the application; and
    transmitting the file to the remote backend system for integration with the application on the backend system.

11. The method of claim 10, further comprising:
    updating, via the processor, a version of the portion of the rule design interface independently from a version of the application running on the remote backend system.

12. The method of claim 10, wherein creating the file includes determining a programming language for the file that is compatible with the application.

13. The method of claim 12, wherein the attribute of the application is used in determining the programming language.

14. The method of claim 10, further comprising receiving a data dictionary corresponding to the application on the backend system and utilizing the data dictionary in providing the portion of the rule design interface.

15. The method of claim 10, wherein providing the portion of the rule design interface to the requesting entity includes selecting the portion from amongst a plurality of different portions based on the attribute of the application.

16. The method of claim 10, wherein transmitting the file to the remote backend system includes uploading the file to a location in the backend system that is designated for storing modified rules for compilation.

17. The method of claim 10, further comprising making a remote procedure call to the remote backend system that causes the remote backend system to integrate the modified rule set by compiling them.

18. A non-transient computer-readable medium containing instructions that, when executed by a processor, cause the processor to perform stages comprising:
    receiving a request from a requesting entity for at least a portion of a rule design interface;
    receiving information regarding an application that utilizes the rules used in a remote backend system, wherein the information received is in response to a remote procedure call made by a computing cloud to the requesting entity;
    providing the portion of the rule design interface by utilizing the information regarding the current set of rules;
    modifying the current set of rules according to user inputs;
    creating a file representing the modified set of rules by utilizing the information regarding the application that utilizes the rules to format the file in a language and structure that is compatible with the application; and
    transmitting the file to the remote backend system for compilation and execution on the backend system.

* * * * *